United States Patent [19]

Hugl et al.

[11] 4,247,460

[45] Jan. 27, 1981

[54] DISAZO DYESTUFF SULPHURIC ACID ESTER

[75] Inventors: Herbert Hugl; Gerhard Wolfrum, both of Leverkusen, Fed. Rep. of Germany

[73] Assignee: Bayer Aktiengesellschaft, Leverkusen, Fed. Rep. of Germany

[21] Appl. No.: 941,978

[22] Filed: Sep. 13, 1978

[30] Foreign Application Priority Data

Sep. 17, 1977 [DE] Fed. Rep. of Germany ....... 2741926

[51] Int. Cl.³ .................. C09B 31/06; C09B 33/02; D06P 3/06; D06P 3/24
[52] U.S. Cl. .................. 260/186; 260/187; 260/191; 260/196; 260/205; 260/206; 260/207; 260/207.1; 260/208; 260/458 C; 564/86
[58] Field of Search .................. 260/186, 187, 191

[56] References Cited

U.S. PATENT DOCUMENTS

| | | | |
|---|---|---|---|
| 2,784,204 | 3/1957 | Heyna et al. | 260/186 X |
| 3,457,251 | 7/1969 | Meininger | 260/148 |
| 3,930,794 | 1/1976 | Birke et al. | 260/191 X |
| 3,945,992 | 3/1976 | Sommer et al. | 260/174 |
| 3,951,944 | 4/1976 | Fuchs | 260/186 |
| 4,024,126 | 5/1977 | Sommer et al. | 260/186 |
| 4,036,824 | 7/1977 | Moritz | 260/186 |
| 4,049,641 | 9/1977 | Sommer et al. | 260/191 |

FOREIGN PATENT DOCUMENTS

968247 9/1964 United Kingdom .................. 260/191

*Primary Examiner*—Floyd D. Higel

*Attorney, Agent, or Firm*—Sprung, Felfe, Horn, Lynch & Kramer

[57] ABSTRACT

A dyestuff particularly for synthetic fibers of the formula

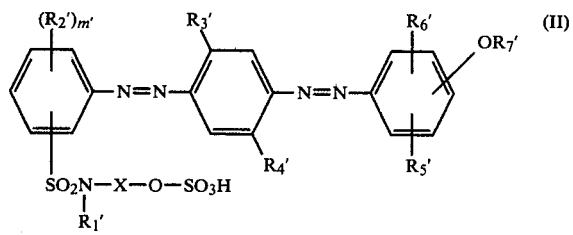

wherein $R_1'$ denotes hydrogen, methyl, ethyl or cyclohexyl, $R_2'$ denotes chlorine, methoxy, methyl, ethoxy, ethyl, trifluoromethyl or acetylamino, $R_3'$ denotes hydrogen, methyl, methoxy, ethyl and ethoxy, $R_4'$ denotes hydrogen, methyl, methoxy, ethyl and ethoxy, $R_5'$ denotes hydrogen, methyl, methoxy, chlorine or phenyl, $R_6'$ denotes hydrogen or methyl, $R_7'$ denotes hydrogen, methyl, ethyl, 2-hydroxyethyl, 2-hydroxypropyl and 2-hydroxybutyl, m' denotes 0 or 1 and X denotes optionally branched $C_2$ to $C_4$ alkylene.

3 Claims, No Drawings

DISAZO DYESTUFF SULPHURIC ACID ESTER

The invention relates to disazo dyestuffs which, in the form of the free acid, correspond to the general formula

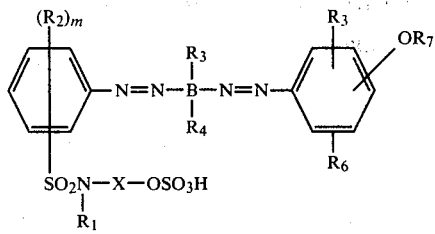

wherein $R_1$ denotes hydrogen, optionally substituted alkyl, optionally substituted phenyl or cyclohexyl, $R_2$ denotes chlorine, bromine, optionally substituted alkoxy, optionally substituted alkyl, acetylamino or benzoylamino, $R_3$ and $R_4$ denote hydrogen, chlorine, bromine, optionally substituted alkoxy or optionally substituted alkyl, $R_5$ and $R_6$ denote hydrogen, optionally substituted alkyl, optionally substituted alkoxy, chlorine or optionally substituted phenyl, $R_7$ denotes optionally substituted alkyl, optionally substituted alkylcarbonyl, optionally substituted phenylcarbonyl, alkylsulphonyl or optionally substituted phenylsulphonyl, X denotes optionally branched $C_2$-$C_4$-alkylene, B denotes 1,4-phenylene, 1,4-naphthylene or tetrahydro-1,4-naphthylene and m denotes a number from 0-2, and their preparation and use for dyeing synthetic fibre materials, in particular those made of polyamides.

Preferred alkyl or alkoxy is alkyl or alkoxy with 1-4 C atoms, which can be further substituted, for example, by fluorine, chlorine, cyano, hydroxyl, $C_1$-$C_4$-alkoxy, phenoxy, $C_1$-$C_4$-alkylcarbonyloxy or phenyl. Examples of suitable alkyl groups are —$CH_3$, —$C_2H_5$, —$C_3H_7$, —$C_4H_9$, —$C_2H_4CN$, —$CH_2$—$C_6H_5$ and $CF_3$.

Examples of suitable alkoxy groups are —$OCH_3$, —$OC_2H_5$, —$OC_3H_7$, —$OC_4H_9$, —$OCH_2CH_2OH$ and —$OCH_2C_6H_5$.

Examples of substituents of the phenyl radicals are $C_1$—$C_4$-alkoxy, chlorine, cyano, nitro and $C_1$—$C_4$-alkyl.

The sulphonamide group in the formula (I) is in the ortho-position, meta-position or para-position relative to the azo bridge, and the radical $OR_7$ is in the ortho-position or para-position relative to the azo bridge.

Preferred dyestuffs are those in which

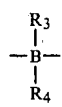

denotes 1,4-naphthylene or tetrahydro-1,4-naphthylene which is not further substituted, or a radical of the formula

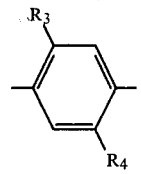

Particularly valuable dyestuffs are those in which m denotes 0 or 1, in particular those of the formula

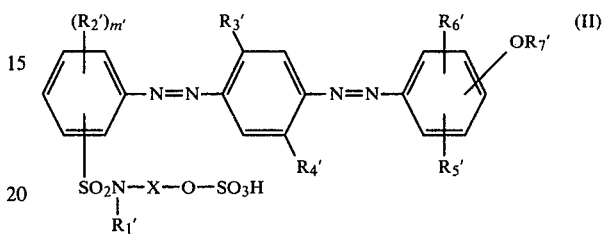

wherein $R_1'$ denotes hydrogen, methyl, ethyl or cyclohexyl, $R_2'$ denotes chlorine, methoxy, methyl, ethoxy, ethyl, trifluoromethyl or acetylamino, $R_3'$ denotes hydrogen, methyl, methoxy, ethyl and ethoxy, $R_4'$ denotes hydrogen, methyl, methoxy, ethyl and ethoxy, $R_5'$ denotes hydrogen, methyl, methoxy, chlorine or phenyl, $R_6'$ denotes hydrogen or methyl, $R_7'$ denotes hydrogen, methyl, ethyl, 2-hydroxyethyl, 2-hydroxypropyl and 2-hydroxybutyl, m' denotes 0 or 1 and X has the meaning indicated above.

Further particularly valuable dyestuffs are those of the formula

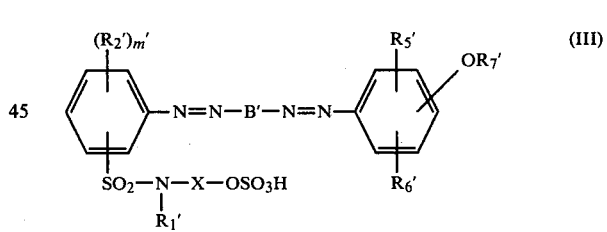

wherein

B' denotes 1,4-naphthylene or tetrahydro-1,4-naphthylene and $R_1'$, $R_2'$, $R_5'$, $R_6'$, $R_7'$ and m' have the meaning indicated above.

The dyestuffs of the formula (I) are prepared in a known manner in which amines of the formula

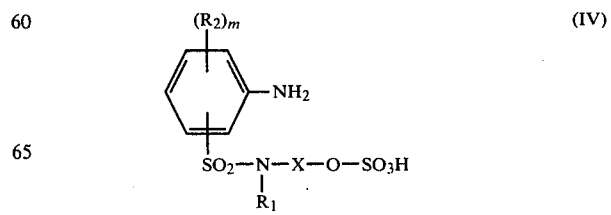

wherein R₁, R₂, X and m have the meaning indicated above, are diazotised, the diazotisation products are reacted with amines of the formula $$H-\underset{\underset{R_4}{|}}{\overset{\overset{R_3}{|}}{B}}-NHZ \quad (V)$$

wherein
R₃, R₄ and B have the meaning indicated above and
Z represents H or —CH₂SO₃H,
to give monoazo dyestuffs of the formula

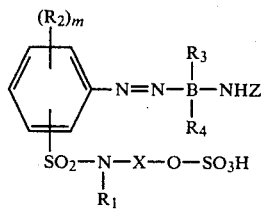
(VI)

and, after appropriately splitting off the group Z, if necessary, by alkaline or acid saponification, the monoazo dyestuffs thus obtained are diazotised, the diazotisation products are coupled with phenols, which couple in the ortho-position or para-position relative to the OH group, of the formula

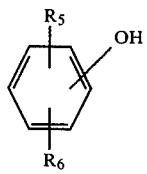
(VII)

wherein R₅ and R₆ have the meaning indicated above, and the disazo dyestuffs of the formula

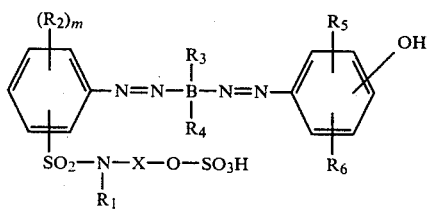
(VIII)

are then alkylated or acylated, the group R₇ being introduced.

Various methods are suitable for the preparation of the diazo components (IV). For example, it is possible to react sulphonic acid halides of the formulae (IX) to (XI) with amines of the formula (XII) and appropriately to saponify the acylamino group or reduce the nitro group.

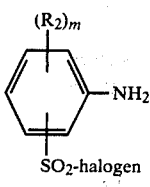  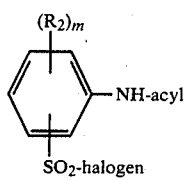
(IX)  (X)

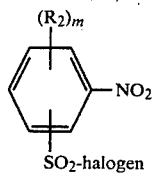  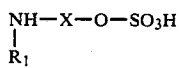
(XI)  (XII)

A further possibility for the preparation of the sulphuric acid half-esters (IV) is in the form of esterification of hydroxy compounds of the formula (XIII) to (XV), for example by introducing them into concentrated sulphuric acid, sulphuric acid monohydrate or oleum, preferably at temperatures between −5° C. and 20° C., and subsequently stirring the mixture for several hours.

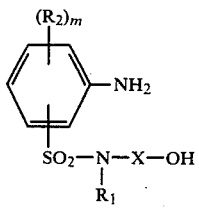  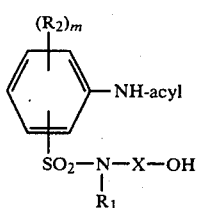
(XIII)  (XIV)

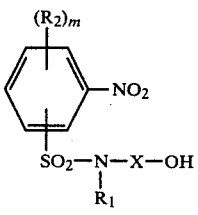
(XV)

The sulphuric acid half-ester compounds are precipitated by discharging the mixture onto ice-water and are neutralised, whilst cooling, and can be isolated, if appropriate after salting out with sodium chloride or potassium chloride, by filtration.

The sulphuric acid half-esters from the compounds (XIV) and (XV) are converted into the diazo components (IV) by saponification of the acyl group or reduction of the nitro group.

The dyestuffs of the formula (I) according to the invention are also obtained by converting dyestuffs of the formula (XVI) into the sulphuric acid half-esters, analogously to the above process.

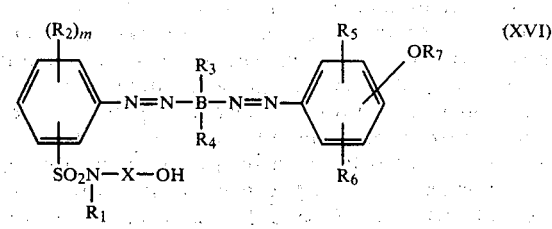

(XVI)

If this preparation method is used, $R_7$ should not contain an aliphatic hydroxyl group, since otherwise two sulphuric acid half-ester radicals are introduced into the molecule.

The introduction of the sulphuric acid half-ester group into the molecule can also be effected by esterification of the monoazo intermediate stage (XVII) by the process indicated.

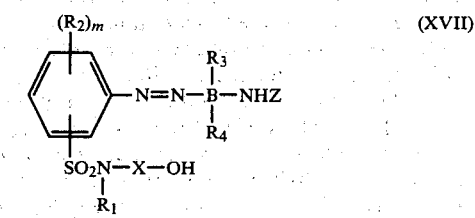

(XVII)

Examples which may be mentioned of suitable alkylating and acylating agents for introducing the radical $R_7$ are dimethyl sulphate, diethyl sulphate, methyl chloride, methyl iodide, ethyl chloride, propyl bromide, isopropyl bromide, butyl iodide and benzyl bromide, p-toluenesulphonic acid methyl ester, benzenesulphonic acid ethyl ester and p-toluenesulphonic acid benzyl ester, and furthermore ethylene oxide, 1,2-propylene oxide, 1,2- and 2,3-butylene oxide, styrene oxide, glycidol, glycidyl methyl ether, glycidyl acetate, glycidyl propionate, glycidyl metacrylate, glycidyl benzyl ether, epichlorohydrin, isobutylene oxide, acetic anhydride, acetyl chloride, chloroacetyl chloride, propionic anhydride, propionyl chloride, butyric anhydride, isovaleryl chloride, benzoyl chloride, benzoic anhydride, 3-chlorobenzyl chloride, 4-chlorobenzoyl chloride, 3-methylbenzoyl chloride, 4-methylbenzoyl chloride, methanesulphonyl chloride, propanesulphonyl chloride, butanesulphonyl chloride, benzenesulphonyl chloride, o-, m- and p-chlorobenzenesulphonyl chloride, o-, m- and p-toluenesulphonyl chloride and the corresponding sulphonyl bromides.

The amines of the formula (IV) are diazotised by methods which are in themselves known, preferably in aqueous, mineral acid solution using sodium nitrite. The coupling of the diazonium compounds of the amines of the formula (IV) with the coupling components of the formula (V) can be carried out by processes which are in themselves known, for example in a neutral to strongly acid, but preferably in a weakly acid, pH range in an aqueous or organic/aqueous medium.

The monoazo dyestuffs of the formula (IV) are isolated by known methods, for example by filtration or by salting out with a salt which is soluble in aqueous solution, for example with NaCl or KCl, and subsequent filtration. If coupling components of the formula (V) in which $Z=-CH_2SO_3H$ are employed, it is frequently necessary only to isolate the monoazo dyestuffs after the amino group of the coupling component has been liberated by alkaline or acid saponification. However, intermediate isolation of the monoazo dyestuffs is not always necessary, they can also be further diazotised without isolation.

The further diazotisation of the aminoazo dyestuffs (VI) in which $Z=H$ can be carried out, for example, in an acid, aqueous dispersion using sodium nitrite solution, it being possible for the diazotisation temperatures to be between 0° and 30° C. In addition, aminoazo dyestuffs of the formula (VI) in which $Z=H$ can also be indirectly diazotised by dissolving them under alkaline conditions, adding sodium nitrite solution and pouring the mixture into aqueous hydrochloric acid or adding hydrochloric acid.

The further diazotisation of the aminoazo dyestuffs (VI) can also be carried out in an aqueous/organic or purely organic medium, organic acids appropriately being added. Examples of organic solvents which may be mentioned are dimethylformamide, dimethylsulphoxide, methylene chloride or chloroform.

The coupling of the diazotised aminoazo dyestuffs (VI) with the final components (VII) to give the diazo dyestuffs (VIII) is also carried out in the customary manner, preferably in an aqueous-alkaline medium. The disazo dyestuffs of the formula (VIII) can be isolated by simple filtration, if appropriate after adding sodium chloride. If the dyestuffs are obtained in the impure form, they can be reprecipitated in a known manner from hot water, alkali being added if appropriate.

The reaction of the disazo dyestuffs (VIII) with the alkylating agents to give the dyestuffs (I) is carried out in the customary manner, for example in an aqueous, aqueous/organic or organic medium, alkali being added.

The sparingly soluble dyestuffs (I) can be rendered readily water-soluble by mixing them with salts of strong bases and weak acids, for example trisodium phosphate, disodium hydrogen phosphate, sodium tetraborate, sodium metaphosphate, sodium metasilicate, sodium carbonate or potassium carbonate, or with alkali metal hydroxides, such as sodium hydroxide, potassium hydroxide or lithium hydroxide.

The new dyestuffs of the formula (I) can be isolated or can exist or can be put to further use in the form of the free acid or as the alkali metal salts or ammonium salts. Examples of suitable alkali metal salts, in which the hydrogen atom of the sulpho group is thus replaced by an alkali metal cation, are the sodium salts, potassium salts or lithium salts.

The new dyestuffs are particularly suitable for dyeing and printing natural and synthetic fibre materials containing amide groups, for example those fibre materials made of wool, silk and polyamide, such as poly-ε-caprolactam or the reaction product of hexamethylenediamine and adipic acid. The resulting dyeings, in particular those on polyamide materials, are distinguished by good fastness properties, in particular good fastness to wet processing and good fastness to light. The affinity under neutral conditions and the combination properties with other dyestuffs which are suitable for this material are also good. The dyestuffs of the formula (I) are employed for dyeing either in the form of the free acid or as the alkali metal salt or ammonium salt.

In the examples which follow, percentages denote percentages by weight

EXAMPLE 1

221.5 g of 3-nitro-benzenesulphonyl chloride are introduced in portions into a solution of 150 g of sulphuric acid mono-2-amino-ethyl ester and 0.6 liter of water at 60°–70° C. During this procedure, the pH value is continuously kept between 9.0 and 10.0 by adding 45% strength sodium hydroxide solution dropwise. The mixture is subsequently stirred at 60°–70° C. and pH 9.0 to 10.0 for 1 hour and then allowed to cool and the resulting precipitate is filtered off. The precipitate is washed with water and dried at 80° C. 305 g of sulphuric acid mono-N-(3-nitro-benzenesulphonyl)-2-amino-ethyl ester are obtained. This ester is dissolved in 1.5 liters of dimethylformamide and hydrogenated over Raney nickel. After subsequently filtering off the catalyst and distilling off the solvent in vacuo, about 220 g of sulphuric acid mono-N-(3-aminophenylsulphonyl)-2-aminoethyl ester are obtained.

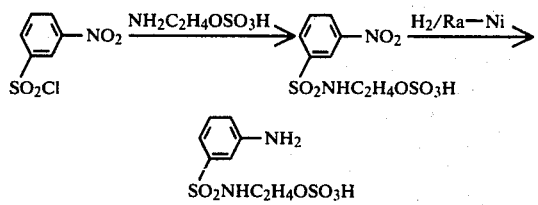

EXAMPLE 2

216 g of 3-amino-N-(2-hydroxyethyl)-benzenesulphonamide are stirred into 0.4 liter of sulphuric acid monohydrate at 0°–5° C., whilst cooling. The mixture is subsequently stirred, first at 0°–5° C. for 1 hour and then at 15°–20° C. for 3 hours. The solution is then discharged onto about 2.5 liters of ice-water, the temperature being kept below 5° C. The resulting precipitate is allowed to settle, the sulphuric acid solution is largely distilled off, the reaction product is filled up to a volume of about 1 liter with ice-water, the mixture is neutralised by adding 45.0% strength sodium hydroxide solution dropwise, whilst cooling, and the resulting precipitate is filtered off. It is washed with a little water and can be employed in the subsequent diazotisation reaction as a moist paste. If the precipitate is dried, about 200 g of sulphuric acid mono-N-(3-amino-phenylsulphonyl)-2-aminoethyl ester are obtained.

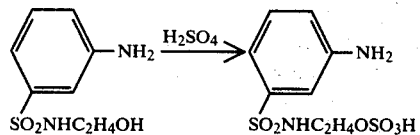

EXAMPLE 3

29.6 g of sulphuric acid mono-N-(3amino-phenylsulphonyl)-2-aminoethyl ester are dissolved in 200 ml of water, with the addition of 10% strength sodium hydroxide solution, and 7.0 g of sodium nitrite are added. The solution thus obtained is allowed to run into 200 ml of ice/H$_2$O and 35 g of concentrated hydrochloric acid and diazotisation is carried out at 0°–5° C. in the course of 0.5 hour; thereafter, the excess of nitrous acid is removed with amidosulphic acid and the diazonium salt suspension is allowed to run into a solution of 20.5 g of anilino-methanesulphonic acid and 9 g of sodium bicarbonate in 100 ml of water at 0°–5° C., and the pH is kept between 5 and 7 by further addition of sodium bicarbonate. After the coupling has ended, the dyestuff is salted out with sodium chloride, filtered off and washed with saturated sodium chloride solution. The moist dyestuff pasts is stirred in 200 g of 7% strength sodium hydroxide solution at 80°–90° C. for 1 hour. After the splitting off of the sulphomethyl group has ended, the dyestuff is precipitated by adding sodium chloride, filtered off and washed with saturated sodim chloride solution.

The aminoazo dyestuff thus obtained is dissolved in 500 ml of water, 7.0 g of sodium nitrite are added, diazotization is carried out at 10°–20° C. in the course of 30 minutes by pouring the mixture onto 1,000 ml of water and 30 g of concentrated hydrochloric acid, and thereafter the excess of nitrous acid is destroyed with amidosulphonic acid. The diazonium salt suspension thus obtained is stirred into a solution of 9.5 g of phenol and 4 g of sodium hydroxide in 200 parts of water at 10°–20° C., and the pH is kept between 9 and 10 by adding 10% strength sodium hydroxide solution. After the coupling has ended, the disazo dyestuff is filtered off and dissolved at pH 8 in 500 ml of water and 2 g of sodium carbonate. 30 g of propylene oxide are added dropwise to this solution at 70° C. and the mixture is subsequently stirred at 70° C. for 6 hours. 80 g of sodium chloride are then added in portions, the mixture is allowed to cool and the dyestuff which has precipitated is filtered off. The dyestuff is washed with 3% strength sodium chloride solution and dried at 50° C. in vacuo. It corresponds, in the form of the free acid, to the formula

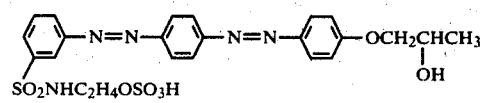

and dyes polyamide in yellow shades of good fastness properties from a weakly acid or neutral bath.

DYEING EXAMPLE 0.1 g of the dyestuff is dissolved hot in 100 ml of water, 5 ml of 10% strength ammonium acetate solution are added and the mixture is diluted to a volume of 500 ml with water. 10 g of polyamide fibres are introduced into the dyebath, the dyebath is brought to the boil in the course of 20 minutes, 4 ml of 10% strength acetic acid are added and the bath is kept at the boiling point for one hour. Thereafter, the fibres are rinsed, and dried at 70°–80° C.

If the procedure followed is as indicated in the above examples, using the initial components, intermediate components and final components and alkylating or acylating agents indicated in the table which follows, further disazo dyestuffs of the general formula (I) which dye polyamide in the yellow to scarlet shades indicated are obtained.

| Example | Starting component | Intermediate component | Final component | Alkylating or acylating agent | Colour shade |
|---|---|---|---|---|---|
| 4 | Sulphuric acid mono-N-(2- | 3-Amino-4-methoxy- | o-Cresol | Dimethyl sulphate | orange |

-continued

| Example | Starting component | Intermediate component | Final component | Alkylating or acylating agent | Colour shade |
|---|---|---|---|---|---|
|  | amino-phenylsulphonyl)-2-aminoethyl ester | toluene |  |  |  |
| 5 | Sulphuric acid mono-N-(2-amino-phenylsulphonyl)-2-aminoethyl ester | 5,6,7,8-tetrahydro-naphth-1-ylamine | p-Cresol | 1,2-Butylene oxide | orange |
| 6 | Sulphuric acid mono-N-(4-amino-phenylsulphonyl)-2-aminoethyl ester | 2-Amino-anisole | 1-Hydroxy-4-tertiary butyl-benzene | — | yellow-brown |
| 7 | Sulphuric acid mono-N-(4-amino-phenylsulphonyl)-2-aminoethyl ester | 2-Amino-1,4-di-methoxy-benzene | m-Cresol | Diethyl sulphate | scarlet |
| 8 | Sulphuric acid mono-N-(3-amino-4-chloro-phenyl-sulphonyl)-N-methyl-2-aminoethyl ester | 1-Amino-2,5-dimethyl-benzene | 3-Hydroxy-1,2-dimethyl-benzene | Ethylene oxide | orange |
| 9 | Sulphuric acid mono-N-(3-amino-6-chloro-phenyl-sulphonyl)-3-aminopropyl ester | 3-Chloro-aniline | 1-Hydroxy-2-methoxy-benzene | Acetic anhydride | yellow |
| 10 | Sulphuric acid mono-N-(2-amino-4-chloro-phenyl-sulphonyl)-2-aminopropyl ester | 2-Amino-1-ethoxy-benzene | Phenol | Ethyl chloride | yellow |
| 11 | Sulphuric acid mono-N-(2-amino-5-chloro-phenyl-sulphonyl)-3-aminobutyl ester | 2-Amino-1,4-diethoxy-benzene | 1-Chloro-3-hydroxy-benzene | p-Toluenesulphonyl chloride | orange |
| 12 | Sulphuric acid mono-N-(4-amino-5-chloro-phenyl-sulphonyl)-N-phenyl-2-aminoethyl ester | 2-Amino-toluene | o-Cresol | 2,3-Butylene oxide | yellow |
| 13 | Sulphuric acid mono-N-(4-amino-2,5-dichloro-phenyl-sulphonyl)-N-ethyl-2-aminoethyl ester | 2-Amino-1,4-di-methoxy-benzene | 3-Hydroxy-diphenyl | Propylene oxide | scarlet |
| 14 | Sulphuric acid mono-N-(2-amino-3,5-dichloro-phenylsulphonyl)-2-amino-ethyl ester | Aniline | Phenol | Benzoyl chloride | yellow |
| 15 | Sulphuric acid mono-N-(3-amino-4-methyl-phenyl-sulphonyl)-N-cyclohexyl-2-amino-ethyl ester | 3-Amino-anisole | 4-Hydroxy-1,2-dimethyl-benzene | n-Butyl-sulphonyl chloride | yellow |
| 16 | Sulphuric acid mono-N-(4-amino-5-methyl-phenyl-sulphonyl)-N-(3-methyl-phenyl)-2-aminoethyl ester | 2-Amino-4-methoxy-toluene | 1-Chloro-2-hydroxy-benzene | n-Butyl bromide | orange |
| 17 | Sulphuric acid mono-N-(3-amino-2,4-dimethyl-phenylsulphonyl)-2-amino-ethyl ester | 3-Amino-toluene | 1-Hydroxy-4-ethyl-benzene | Isobutylene oxide | orange |
| 18 | Sulphuric acid mono-N-(3-amino-4,6-dimethyl-phenyl-sulphonyl)-N-butyl-2-aminoethyl ester | Aniline | Phenol | γ-Phenoxy-propylene oxide | yellow |
| 19 | Sulphuric acid mono-N-(2-amino-3,5-dimethyl-phenyl-sulphonyl)-3-aminopropyl ester | 1-Amino-naphthalene | m-Cresol | Dimethyl sulphate | orange-red |
| 20 | Sulphuric acid mono-N-(4-amino-3-chloro-5-methyl-phenylsulphonyl)-2-amino-tert.-butyl ester | 2-Amino-1,4-dimethoxy-benzene | p-Cresol | Butyryl chloride | orange |
| 21 | Sulphuric acid mono-N-(2-amino-5-chloro-3-methyl-phenylsulphonyl)-2-amino ethyl ester | 1-Amino-2-ethoxy-benzene | m-Cresol | — | yellow-brown |
| 22 | Sulphuric acid mono-N-(3-amino-6-methyl-phenyl-sulphonyl)-N-methyl-2-aminoethyl ester | Aniline | o-Cresol | Ethylene oxide | yellow |
| 23 | Sulphuric acid mono-N-(4-amino-5-ethoxy-phenyl-sulphonyl)-2-aminoethyl ester | 2-Amino-toluene | Phenol | Epichlorohydrin | yellow |
| 24 | Sulphuric acid mono-N-(3-amino-4-methoxy-phenyl-sulphonyl)-2-aminopropyl ester | 1-Amino-3-ethyl-benzene | o-Cresol | Styrene oxide | yellow |
| 25 | Sulphuric acid mono-N-(3- | 2-Amino-anisole | 1-Chloro-4- | Methyl iodide | reddish- |

| Example | Starting component | Intermediate component | Final component | Alkylating or acylating agent | Colour shade |
|---|---|---|---|---|---|
| | amino-4-methoxy-phenyl-sulphonyl)-2-amino-propyl ester | | hydroxy-benzene | | tinged yellow |
| 26 | Sulphuric acid mono-N-(3-amino-6-methoxy-phenyl-sulphonyl)-N-phenyl-2-aminoethyl ester | 5,6,7,8-Tetrahydro-naphth-1-ylamine | m-Cresol | Propyl bromide | orange |
| 27 | Sulphuric acid mono-N-(4-amino-2-chloro-5-methoxy-phenylsulphonyl)-2-amino-ethyl ester | 2-Amino-1,4-dimethoxy-benzene | m-Cresol | Dimethyl sulphate | scarlet |
| 28 | Sulphuric acid mono-N-(3-amino-5-chloro-4-methoxy-phenylsulphonyl)-N-methyl-2-aminoethyl ester | 2-Amino-4-methoxy-toluene | o-Cresol | 3-Methyl-benzoic acid | yellow |
| 29 | Sulphuric acid mono-N-(3-acetylamino-6-amino-phenylsulphonyl)-2-amino-ethyl ester | Aniline | Phenol | Diethyl sulphate | yellow |
| 30 | Sulphuric acid mono-N-(2-amino-5-benzoylamino-phenylsulphonyl)-N-ethyl-2-aminoethyl ester | 2-Aminoanisole | o-Cresol | 1,2-Butylene oxide | yellow |
| 31 | Sulphuric acid mono-N-(3-acetylamino-6-amino-4-methoxy-phenylsulphonyl)-2-aminoethyl ester | 2-Amino-1,4-dimethoxy-benzene | m-Cresol | Ethylene oxide | scarlet |
| 32 | Sulphuric acid mono-N-(3-amino-4-bromo-phenyl-sulphonyl)-N-cyclohexyl-2-aminoethyl ester | 2-Aminotoluene | Phenol | Dimethyl sulphate | yellow |
| 33 | Sulphuric acid mono-N-(4-amino-5-trifluoromethyl-phenylsulphonyl)-N-methyl-2-aminoethyl ester | Aniline | o-Cresol | Propylene oxide | yellow |
| 34 | Sulphuric acid mono-N-(2-amino-5-trifluoromethyl-phenylsulphonyl)-2-aminoethyl ester | 2-Amino-4-methoxy-toluene | m-Cresol | Methyl chloride | orange |
| 35 | Sulphuric acid mono-N-(2-amino-phenylsulphonyl)-N-cyclohexyl-2-aminoethyl ester | 2-Aminoanisole | o-Cresol | Ethyl chloride | yellow |
| 36 | Sulphuric acid mono-N-(3-amino-phenylsulphonyl-)N-phenyl-2-aminoethyl ester | 2-Amino-4-methoxy-toluene | o-Cresol | Propylene oxide | orange |
| 37 | Sulphuric acid mono-N-(4-amino-phenylsulphonyl)-N-methyl-2-aminoethyl ester | Aniline | Phenol | Dimethyl sulphate | yellow |
| 38 | Sulphuric acid mono-N-(3-amino-4-methyl-phenyl-sulphonyl)-2-aminoethyl ester | 2-Amino-anisole | o-Cresol | Diethyl sulphate | yellow |
| 39 | Sulphuric acid mono-N-(3-amino-4-methoxy-phenyl-sulphonyl)-N-methyl-2-aminoethyl ester | 2-Amino-1,4-dimethoxy benzene | p-Cresol | 1,2-Butylene oxide | scarlet |
| 40 | Sulphuric acid mono-N-(3-amino-phenylsulphonyl)-3-aminopropyl ester | 2-Amino-anisole | Phenol | Methyl chloride | yellow |

EXAMPLE 41

20 g of a dyestuff of the formula

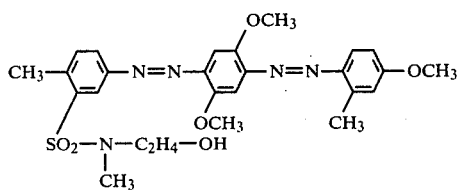

are introduced into 50 ml of 96% strength sulphuric acid at 0°–5° C., whilst cooling. The mixture is subsequently stirred, first at 0°–5° C. for 1 hour and then at 15°–20° C. for 3 hours. The solution is then discharged onto about 300 ml of ice-water, the temperature being kept below 5° C. The dyestuff precipitate is allowed to settle, the sulphuric acid solution is largely decanted off, the product is filled up to a volume of about 200 ml with ice-water, 50 g of sodium acetate are added, whilst cooling, and the resulting precipitate is filtered off. After washing and drying at 60° in a circulating air drying cabinet, about 20 g of a dyestuff of the formula

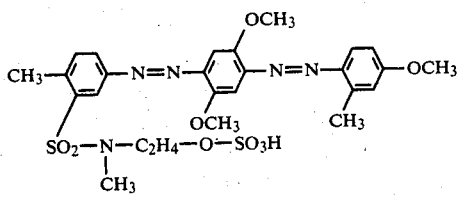

which dyes polyamide scarlet from a weakly acid or neutral bath are obtained. The dyeing has a high level of fastness.

We claim:

1. A disazo dyestuff which, in the form of the free acid corresponds to the formula

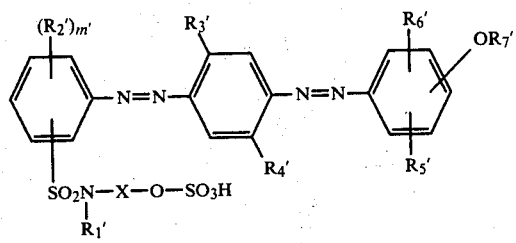

wherein
- $R_1$ denotes hydrogen, alkyl, alkyl substituted by fluorine, chlorine, cyano, hydroxyl, $C_1$-$C_4$-alkoxy, phenoxy, $C_1$-$C_4$-alkylcarbonyloxy or phenyl, phenyl substituted by $C_1$-$C_4$-alkoxy, chlorine, cyano, nitro or $C_1$-$C_4$-alkyl or cyclohexyl,
- $R_2$ denotes chlorine, bromine, alkoxy, alkoxy substituted by fluorine, chlorine, cyano, hydroxyl, $C_1$-$C_4$-alkoxy, phenoxy, $C_1$-$C_4$-alkylcarbonyloxy or phenyl, alkyl, alkyl substituted by fluorine, chlorine, cyano, hydroxyl, $C_1$-$C_4$-alkoxy, phenoxy, $C_1$-$C_4$-alkylcarbonyloxy or phenyl, acetylamino or benzoylamino,
- $R_3$ and $R_4$ denote hydrogen, chlorine, bromine, alkoxy or alkyl, which alkoxy or alkyl can be unsubstituted or is substituted by fluorine, chlorine, cyano, hydroxyl, $C_1$-$C_4$-alkoxy, phenoxy, $C_1$-$C_4$-alkylcarbonyloxy or phenyl,
- $R_5$ and $R_6$ denote hydrogen, alkyl, alkoxy, chlorine or phenyl, which alkyl or alkoxy can be unsubstituted or is substituted by fluorine, chlorine, cyano, hydroxyl, $C_1$-$C_4$-alkoxy, phenoxy, $C_1$-$C_4$-alkylcarbonyloxy or phenyl and which phenyl can be substituted by $C_1$-$C_4$ alkoxy, chlorine, cyano, nitro or $C_1$-$C_4$-alkyl,
- $R_7$ denotes alkyl, alkylcarbonyl, phenylcarbonyl, alkylsulphonyl or phenylsulphonyl, which alkyl can be unsubstituted or is substituted by fluorine, chlorine, cyano, hydroxyl, $C_1$-$C_4$-alkoxy, phenoxy, $C_1$-$C_4$-alkylcarbonyloxy or phenyl and which phenyl can be substituted by $C_1$-$C_4$ alkoxy, chlorine, cyano, nitro or $C_1$-$C_4$-alkyl,
- X denotes branched or unbranched $C_2$-$C_4$-alkylene,
- B denotes 1,4-phenylene, 1,4-naphthylene or tetrahydro-1,4-naphthylene and
- m denotes a number from 0–2.

2. Disazo dyestuffs according to claim 1, which, in the form of the free acid, correspond to the formula

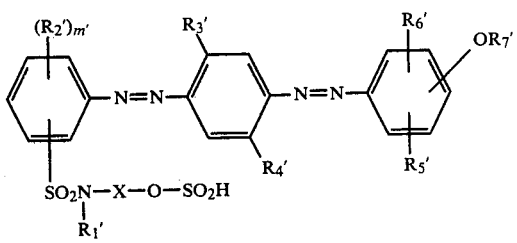

wherein
- $R_1'$ denotes hydrogen, methyl, ethyl or cyclohexyl,
- $R_2'$ denotes chlorine, methoxy, methyl, ethoxy, ethyl, trifluoromethyl or acetylamino,
- $R_3'$ denotes hydrogen, methyl, methoxy, ethyl and ethoxy,
- $R_4'$ denotes hydrogen, methyl, methoxy, ethyl and ethoxy,
- $R_5'$ denotes hydrogen, methyl, methoxy, chlorine or phenyl,
- $R_6'$ denotes hydrogen or methyl,
- $R_7'$ denotes hydrogen, methyl, ethyl, 2-hydroxyethyl, 2-hydroxypropyl and 2-hydroxybutyl,
- $m'$ denotes 0 or 1 and
- X has the meaning indicated in claim 1.

3. Disazo dyestuffs according to claim 1 which, in the form of the free acid, correspond to the formula

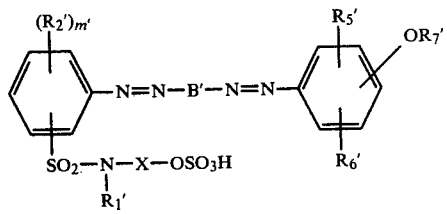

wherein
- $B'$ denotes 1,4-naphthylene or tetrahydro-1,4-napthylene and
- $R_1'$, $R_2'$, $R_5'$, $R_6'$, $R_7'$ and $m'$ have the meaning indicated in claim 2.

* * * * *